United States Patent [19]
Coath et al.

[11] Patent Number: 5,418,645
[45] Date of Patent: May 23, 1995

[54] ENDOSCOPIC ZOOM LENS

[75] Inventors: Philip M. Coath; Naeem A. Sayed, both of Essex, United Kingdom

[73] Assignee: Keymed (Medical & Industrial Equipment) Ltd., Essex, United Kingdom

[21] Appl. No.: 66,424

[22] Filed: May 25, 1993

[30] Foreign Application Priority Data

Jun. 11, 1992 [GB] United Kingdom ........... 92 12 434.6

[51] Int. Cl.⁶ ............................................. G02B 15/14
[52] U.S. Cl. ................................. 359/676; 359/690; 359/694; 359/698
[58] Field of Search ............... 359/692, 676, 690, 694, 359/698

[56] References Cited

U.S. PATENT DOCUMENTS

| | | | |
|---|---|---|---|
| 4,312,572 | 1/1982 | Yamashita et al. | 350/423 |
| 4,448,039 | 12/1984 | Sato et al. | 250/216 |
| 4,704,007 | 11/1987 | Landre et al. | 350/414 |
| 4,874,232 | 10/1989 | Hasegawa | 350/427 |
| 4,976,522 | 12/1990 | Igarashi | 350/426 |
| 5,245,475 | 9/1993 | Takasugi | 359/690 |

*Primary Examiner*—Scott J. Sugarman
*Attorney, Agent, or Firm*—Beveridge, DeGrandi, Weilacher & Young

[57] ABSTRACT

Apparatus (1) for use as an endoscope or borescope comprising an outer tube (2) having a distal end (3) which is insertable into an inaccessible location to be inspected and a proximal end (4) which is accessible to the user. A zoom lens is provided within the outer tube adjacent the distal end and is operable to focus an image with variable magnification at a focal plane within the outer tube. The zoom lens comprises an objective lens (7) which is fixed relative to the outer tube and two independently movable lenses (8,13). An elongate viewing means (43) is provided for viewing the image and extends through the outer tube from a location at the focal plane to a location proximal of the proximal end. A cam operated actuating means (29,21) is operable to move the movable lenses to change magnification and to synchronously move the viewing means relative to the objective lens to compensate for movement of the focal plane. Refocussing of the apparatus following adjustment of magnification is thereby carried out automatically.

9 Claims, 5 Drawing Sheets

ENDOSCOPIC ZOOM LENS

BACKGROUND OF THE INVENTION

This invention relates to an optical apparatus for use as an endoscope or borescope for inspection of inaccessible objects.

It is desirable for such apparatus to be provided with variable magnification in the form of a zoom lens which ideally should be located at the distal end of the instrument and may incorporate the objective lens. Endoscopes and borescopes however typically comprise a long tube of the order of 10 mm or less in diameter. Consequently any mechanism for providing independent movement of lenses within the zoom lens must be miniature in form and must be actuated by a mechanism which does not significantly obstruct the available space for a viewing means such as an optical relay which must extend through the tube.

A particular difficulty encountered in the incorporation of such zoom lenses in such apparatus is that of providing compensation for movement of the focal plane of the zoom lens when magnification is varied. In the absence of compensation the viewed image may be completely out of focus and indistinguishable after each adjustment of magnification and it is undesirable for the user to have to carry out anything other than a minor re-focusing operation after each adjustment.

OBJECTS OF THE PRESENT INVENTION

It is an object of the invention to provide an apparatus which avoids the need for the user to carry out refocusing operations after each adjustment of magnification.

It is a further object of the present invention to provide an apparatus in which focus adjustment is available to the user to accommodate variation in object range or eye performance.

SUMMARY OF THE INVENTION

According to the present invention there is provided apparatus for use as an endoscope or borescope for inspection of an inaccessible object comprising an outer tube having a distal end which is insertable in use into an inaccessible location and a proximal end which is accessible to the user, a zoom lens within the outer tube adjacent the distal end and operable to focus an image of the object with variable magnification at a focal plane within the outer tube, the zoom lens comprising an objective lens which is fixed relative to the outer tube and a plurality of independently movable lenses, the apparatus further comprising an elongate viewing means for viewing the image and extending through the outer tube from a location at or adjacent to the focal plane to a location proximal of the proximal end and actuating means operable to move the movable lenses to change magnification and to synchronously move the viewing means relative to the objective lens to compensate for movement of the focal plane.

An advantage of such apparatus is that (provided the object distance remains unchanged) it is not necessary to re-focus the viewing means following actuation of the zoom lens to change magnification.

Preferably each of the movable lenses is provided with a respective axially movable control tube to which they are fixedly mounted, the control tubes extending coaxially within the outer tube and being engaged at their respective proximal end portions by the actuator means.

An advantage of such arrangement is that the control tubes provide robust support for the movable lenses in a simple and space efficient manner.

Preferably the actuating means comprises a cam means providing movement of the movable lenses and the viewing means in response to movement of an actuator.

Conveniently the cam means comprises a cylindrical member, the cylindrical member being provided with circumferentially extending cam slots engaged by respective radial projections of the control tubes, and the cam slots being profiled such that rotation of the cylindrical member relative to the outer tube provides axial displacement of respective movable lenses in accordance with a predetermined characteristic.

Preferably the cylindrical member is provided with a further cam slot engaged by a cam follower connected to the viewing means to effect axial movement of the viewing means relative to the objective lens by rotation of the cylindrical member.

In a preferred embodiment the zoom lens comprises two movable lenses.

The viewing means may comprise a housing operatively connected to the actuating means to provide axial movement synchronised with movement of the movable lenses, an image relaying means operable to relay an image from the focal plane of the zoom lens to the user and an adjustable coupling operatively connecting the housing to the image relaying means so as to provide focus adjustment accommodating variation in object range or eye performance of the user.

In the absence of such adjustment the apparatus would remain focused at only one particular object range of interest.

An advantage of the particular form of image relaying means of this embodiment is that no adjustment is made to the relative position of the optical components of the image relaying means but instead the entire image relaying means is moved relative to the zoom lens. Such "distal focusing" results in the eye relief for the user remaining constant thereby allowing easy and comfortable use throughout the zoom and focusing ranges of the apparatus.

Conveniently the image relaying means includes an optical relay.

The apparatus may further comprise an object range sensor operable to produce an electrical signal representative of the range of the object from the objective lens and an electromechanical focus actuator operable in response to the signal to focus on the object by movement of the image relaying means relative to the housing.

BRIEF DESCRIPTION OF THE DRAWINGS

Embodiments of the present invention will now be described by way of example only and with reference to the accompanying drawings of which.

DESCRIPTION OF THE PREFERRED EMBODIMENTS

Figure 1:
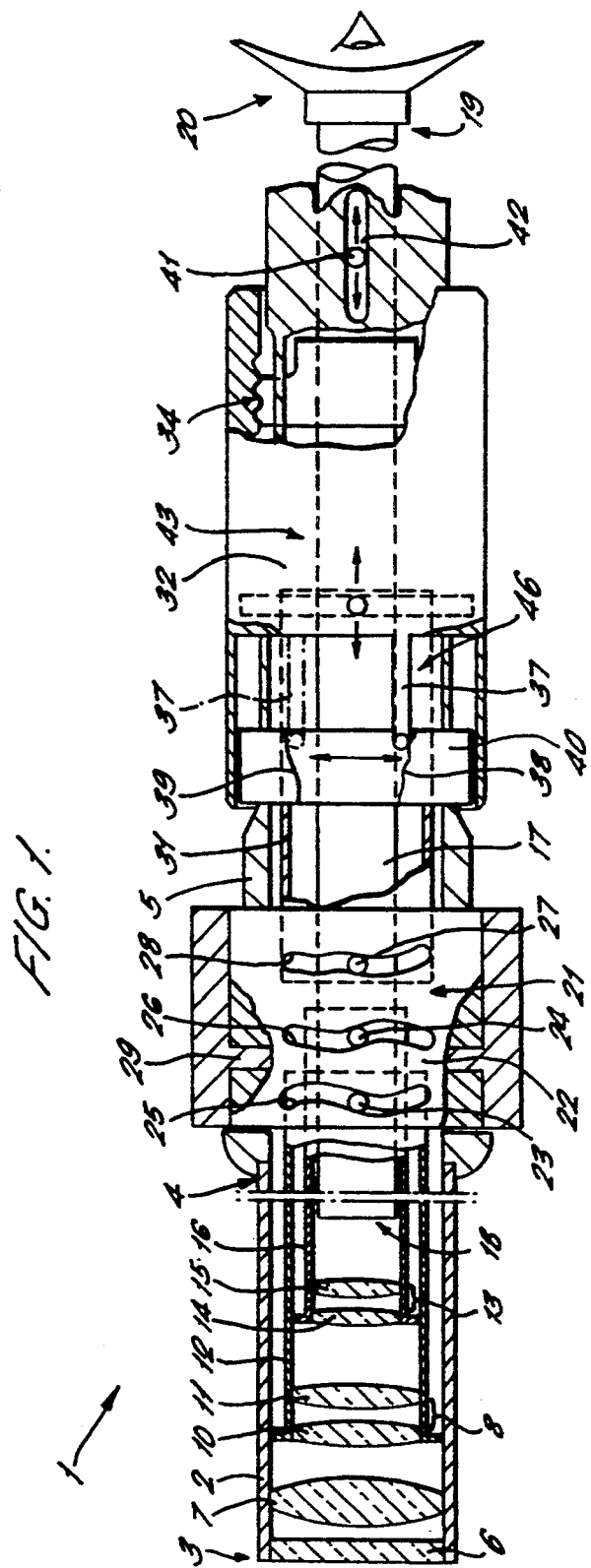
FIG. 1 is a part-sectional plan view of an apparatus in accordance with the present invention.

In FIG. 1 apparatus 1 comprises an optical system for an endoscope having an elongate outer tube 2 with a distal end portion 3 which is insertable into an inaccessible area for inspection of an object (not shown).

The outer tube 2 has a proximal end portion 4 which is accessible to the user and is connected to a casing (5) incorporating a handle (not shown) for manipulating the apparatus.

The outer tube 2 has at the distal end portion 3 a window 6 arranged at right angles to the cylindrical axis of the outer tube and in proximity with the window 6 an objective lens 7 of positive power is fixedly connected to the outer tube.

A first movable lens 8 comprising first and second lens elements 10 and 11 is mounted within a first control tube 12 which is axially slidable within the outer tube 2 so as to control the position of the first movable lens.

The first and second lens elements 10 and 11 are fixedly mounted within the first control tube 12 and are arranged so as to provide in combination the first movable lens 8 with negative power.

A second movable lens 13 comprising third and fourth lens elements 14 and 15 is fixedly mounted in a second control tube 16 which is slidable within the first control tube 12 so as to be able to control axial location of the second movable lens 13.

The third and fourth lens elements 14 and 15 are fixedly connected to the second control tube 16 and in combination provide the second movable lens 13 with positive power.

Within the second control tube 16 is slidably mounted an image relaying means 17 which is generally cylindrical in external shape so as to extend between a distal end portion 18 adjacent to the second movable lens 13 and a proximal end portion 19 to which is mounted an eyepiece 20.

The image relaying means 17 contains an optical relay consisting of a plurality of axially spaced lenses (not shown).

The apparatus 1 includes a cam means 21 located adjacent the proximal end portion 4 of the outer tube 2 and including a generally cylindrical member 22 mounted coaxially with the outer tube 2 so as to be rotatable relative to the casing 5.

The first and second control tubes 12 and 16 extend coaxially through the cylindrical member 22 and are provided adjacent their respective proximal ends with respective first and second cam follower pins 23 and 24 which project radially through respective cam slots 25 and 26 extending generally circumferentially of the cylindrical member 22.

The first control tube 12 projects into the cylindrical member 22 to a lesser extent than the second control tube 16 so that clearance is provided between the second cam follower pin 24 and the first control tube 12.

The second control tube 16 projects into the cylindrical member 22 to approximately the mid-point of the cylindrical member. A third cam follower pin 27 projects radially to engage a third circumferentially extending slot 28 formed in the cylindrical member, the pin 27 being operatively connected to the image relaying means 17 in a manner described below.

An annular magnification control actuator 29 projects radially from the cylindrical member 22 and is manually accessible so that an operator can manually rotate the cylindrical member 22 so as to provide axial motion of the first, second and third cam follower pins 23, 24 and 27 in a manner dependent on the respective profiles of the first, second and third slots 25, 26 and 28.

The third cam follower pin 27 is connected by a longitudinally extending cylindrical linkage 31 to a generally cylindrical housing 32 which is axially slidable relative to the casing 5.

The image relaying means 17 extends coaxially through both the cylindrical linkage 31 and the housing 32 and is adjustably coupled to the housing by means of a screw coupling 34. The housing 32 is rotatable relative to the casing 5 so as to constitute a focus control actuator as described below.

The screw coupling 34 is arranged such that any longitudinal movement of the housing 32 due to movement of the linkage 31 is transmitted to the image relaying means 17 so that it will move in unison with the linkage 31 and hence in unison with the third cam follower pin 27. The longitudinal position of the image relaying means 17 can however be adjusted relative to the linkage 31 by a user manually turning to the left or right the housing 32 which then functions as a focus control actuator. The housing 32 is movable through a limited angular displacement which is delimited by engagement between a detent 37 connected to the housing 32 and first and second stop surfaces 38 and 39 of a focus limiting member 40. The focus limiting member 40 is part annular and fixedly connected to the casing 5 so as to remain static at a location intermediate the housing 32 and the cam means 21.

The first and second stop surfaces 38 and 39 limit the angular displacement of the housing 32 to an extent which is dependent upon the axial position of the housing 32 relative to the casing 5, the first and second stop surfaces 38 and 39 being profiled so as to serve as cam surfaces engaged by the detent 37.

The image relaying means 17 includes a radially outward projection 41 received in an axially extending groove 42 of the casing 5, the groove and projection cooperating to allow relative axial movement but preventing rotation of the image relaying means relative to the casing 5 and relative to the outer tube 2. The first and second control tubes 12 and 16 are provided with similar mechanisms (not shown) operable to prevent rotation relative to the outer tube 2.

The image relaying means 17, the housing 32 and the eyepiece 20 together constitute a viewing means 43 which is axially movable relative to the outer tube 2 and hence relative to the objective lens 7 by actuation of the cam means 21.

Figure 2:
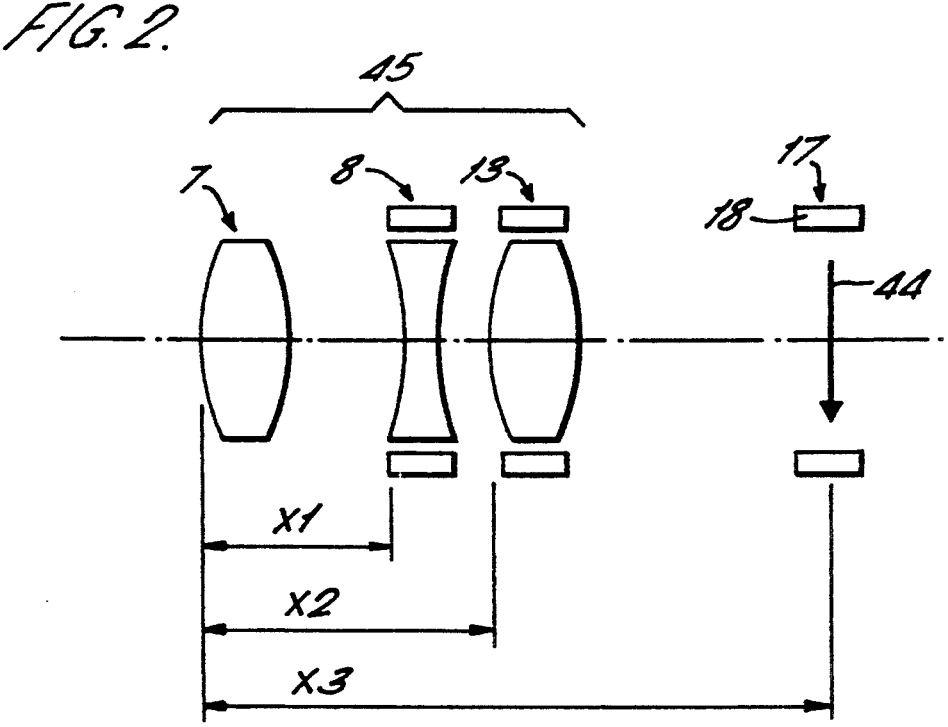
FIG. 2 is a schematic diagram of the zoom lens of the apparatus of FIG. 1.
Figure 3:
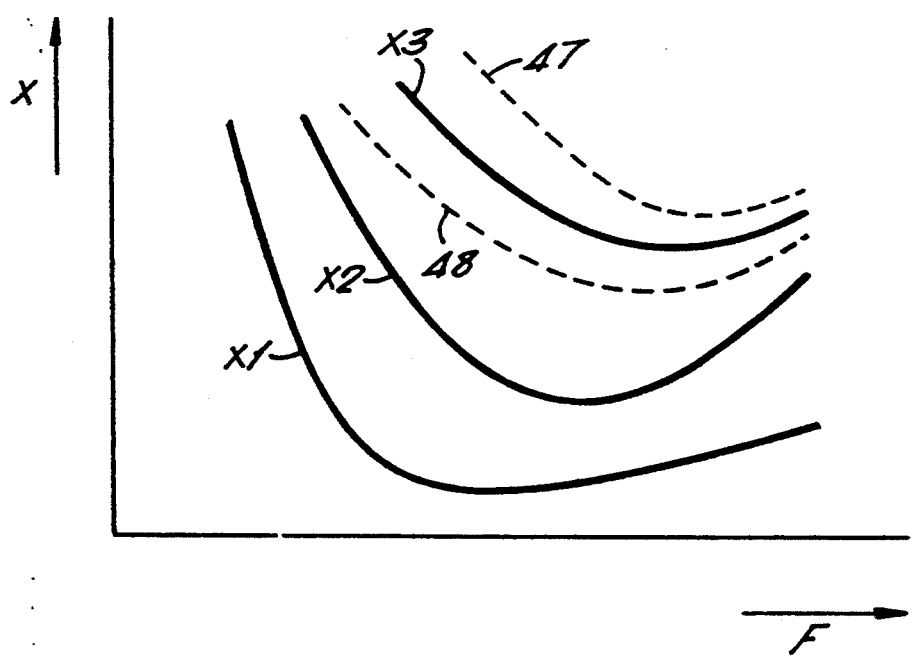
FIG. 3 is a graph illustrating the operation of the cam means of the apparatus of FIG. 1.

Operation of the cam means 21 is illustrated in FIGS. 2 and 3. In FIG. 2 the displacements of the first and second movable lenses 8 and 13 relative to the fixed objective lens 7 are represented by displacements X1 and X2. The displacement of the distal end portion 18 of the image relaying means 17 relative to the fixed objective lens 7 is represented by displacement X3. An image 44 is formed in the focal plane of a zoom lens 45 constituted by the combination of the objective lens 7, the first movable lens 8 and the second movable lens 13. In order to vary the magnification and field of view of the zoom lens 45 the movable lenses 8 and 13 are moved towards or away from the fixed objective lens 7 in a predetermined manner as illustrated in FIG. 3 in which values of displacement X are shown against various values of field of view F. As is well-known in the art of zoom lens construction, it is generally desirable to compensate for movement of the focal plane of the zoom lens in some way. In the apparatus 1 this compensation is provided by movement of the image relaying means 17 as illustrated in FIG. 3.

In order to focus the apparatus 1 onto objects at varying distance from the objective lens 7, rotation of the housing 32 provides axial adjustment of the position of the image relaying means 17 so that to view a distant object X3 is decreased and to view a near object X3 is increased. The upper and lower limits of this adjustment are indicated by the upper and lower broken lines 47 and 48 in FIG. 3. The range of focus adjustment for smaller fields of view is necessarily more than that required for larger fields of view. By action of the focus limiting member 40 co-operating with the first and second stop surfaces 38 and 39 the apparatus 1 is provided with means which limit the range of focus adjustment according to the magnification/field of view setting of the zoom lens 45. This prevents the user from inadvertently focusing outside of the desired range which could result for example in the user focusing on components within the image relaying means 17 itself.

The focus limiting member 40 and the stop surfaces 38,39 together constitute a focus limiting means 46 which under some circumstances will respond to adjustment of the magnification/field of view by automatically moving the image relaying means 17 relative to the housing 32 until the focus adjustment is within acceptable limits. If for example the cylindrical member 22 has been adjusted so that the field of view is at its smallest (producing maximum image size) and the object being viewed is at either the closest possible position or at infinity, the housing 32 will have been fully rotated such that detent 37 is in contact with one of the stop surfaces 38 and 39. If the cylindrical member 22 is then adjusted in position to increase the field of view the housing 32 will be urged axially by action of the linkage 31 driven by the third cam follower pin 27 and this axial movement can only be accommodated if accompanied by rotation of the housing due to cam action between the detent 37 and stop surface 38 or 39.

Figure 4:
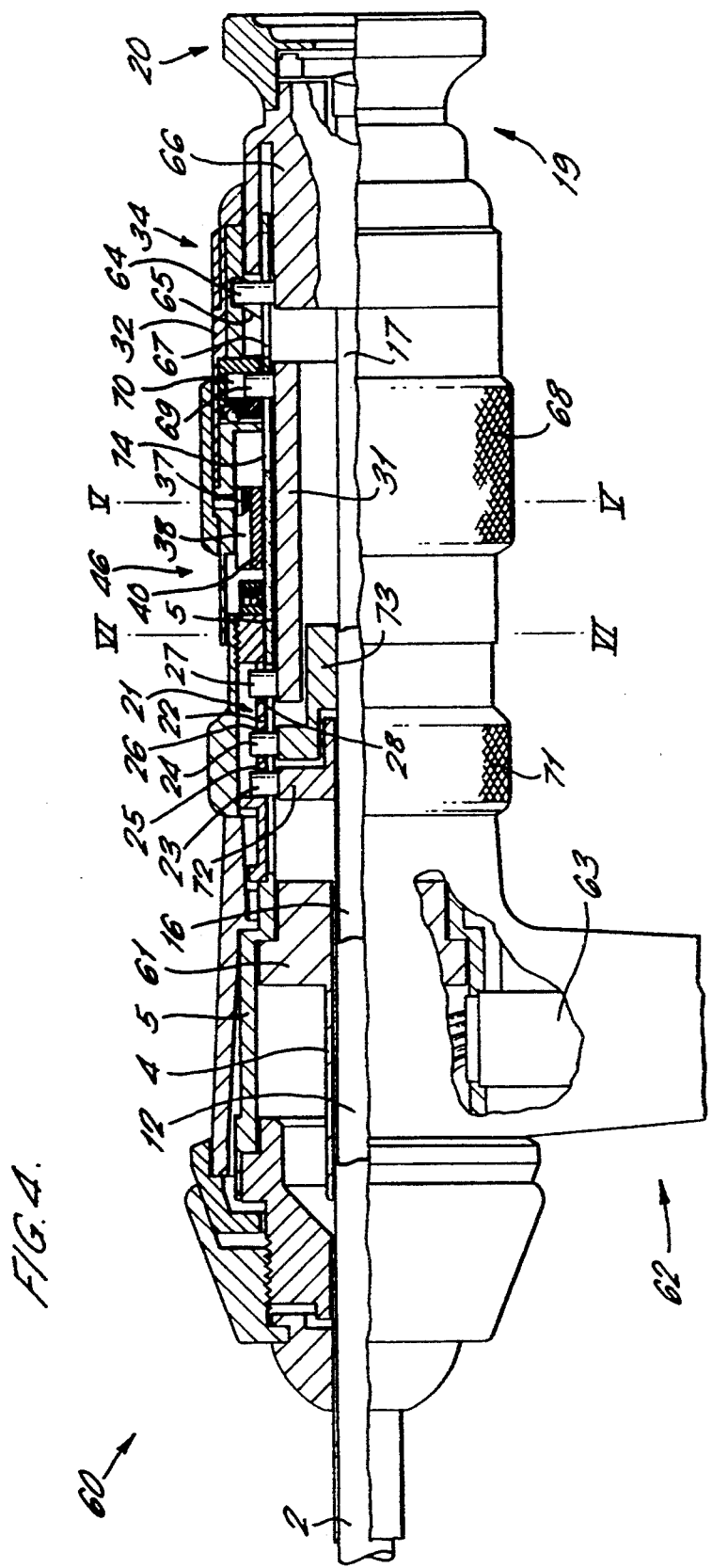
FIG. 4 is a part-sectional side view of an alternative apparatus.
Figure 5:
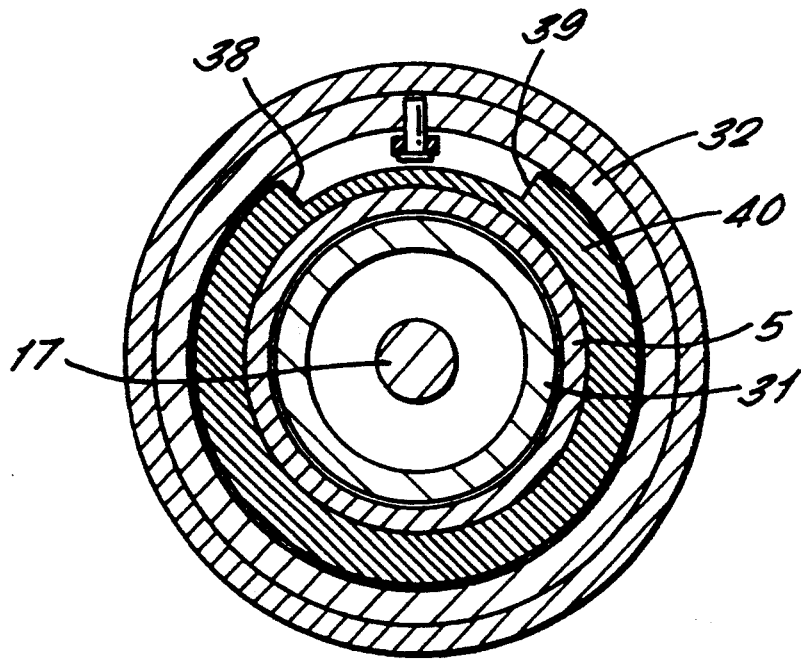
FIG. 5 is a transverse sectional view at V—V of FIG. 4.
Figure 6:
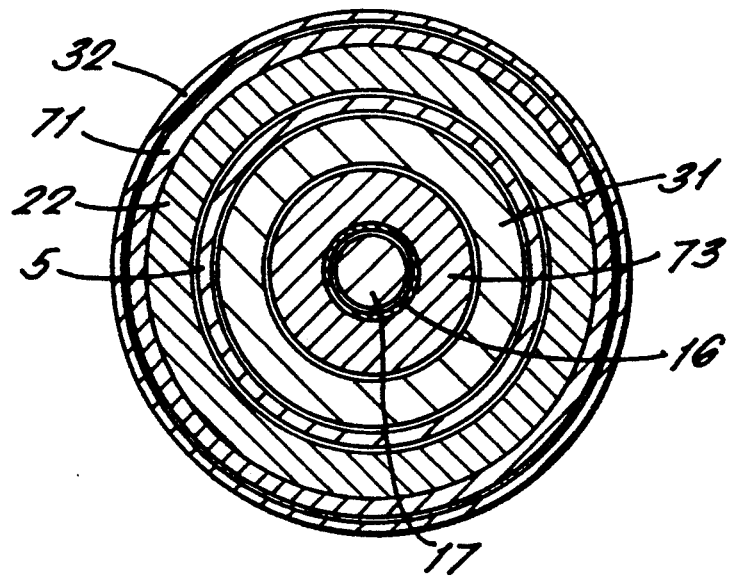
FIG. 6 is a transverse sectional view at VI—VI of FIG. 4.

An alternative apparatus 60 is shown in FIGS. 4, 5 and 6 where corresponding reference numerals to those of preceding figures are used where appropriate for corresponding elements.

Apparatus 60 includes an outer tube 2 having a distal end which is not shown in the Figures but which corresponds to that of the apparatus 1 in that it contains an end window and a zoom lens. Outer tube 2 has a proximal end portion 4 fixedly connected to a collar 61 which is connected to a casing 5.

A handle 62 is connected to the casing 5 and incorporates a light guide connector 63 through which light is directed for illuminating the object via the distal end portion 3.

The apparatus 60 is viewed in side elevation so that the cam follower pins 23, 24 and 27 are shown projecting vertically through the cylindrical member 22. The pins 23 and 24 are connected to their respective control tubes 12 and 16 by brackets 72 and 73.

The apparatus 60 functions essentially in the same way as the apparatus 1 but differs in some constructional detail. The screw coupling 34 of apparatus 1 is replaced in the apparatus 60 by a radially outwardly projecting thread engaging pin 64 which is received in a helical thread 65 formed in the housing 32. The pin 64 is connected to an eyepiece assembly 66 which is connected to both the eyepiece 20 and to the image relaying means 17. The pin 64 also projects through an axially extending slot 67 provided in the casing 5. The slot 67 prevents the eyepiece assembly 66 from rotating relative to the casing 5 whilst permitting relative axial movement.

The housing 32 is rotatable relative to the casing 5 by manual engagement with a knurled focus actuating ring 68. Rotation of the focus actuating ring 68 produces axial movement of the image relaying means 17 which is thereby moved closer to or away from the zoom lens (not shown).

Compensating movement of the image relay means 17 during adjustment of magnification is provided by means of cylindrical linkage 31 which engages the housing 32 by means of a radially outwardly projecting pin 69 which is received in an annular groove 70 defined by the housing 32. The annular groove 70 co-operates with the pin 69 to allow relative rotational movement of the housing whilst constraining the linkage 31 and the housing 32 to move axially in unison. The pin 69 projects through an axially elongate slot 74 formed in the casing 5 which acts to prevent rotation of the linkage 31.

Axial movement of the linkage 31 is provided during magnification adjustment by means of the third cam follower pin 27 engaging the third cam slot 28 provided in cylindrical member 22. The cylindrical member 22 is rotated relative to the casing 5 by manually engaging a knurled magnification actuating ring 71 which is fixedly connected to the cylindrical member 22 and overlays the pins and slots 23 to 28.

The apparatus 1 is provided with a five times variation in magnification by operation of the zoom lens 45 corresponding to a field of view varying between 10° to 50°.

Figure 7:
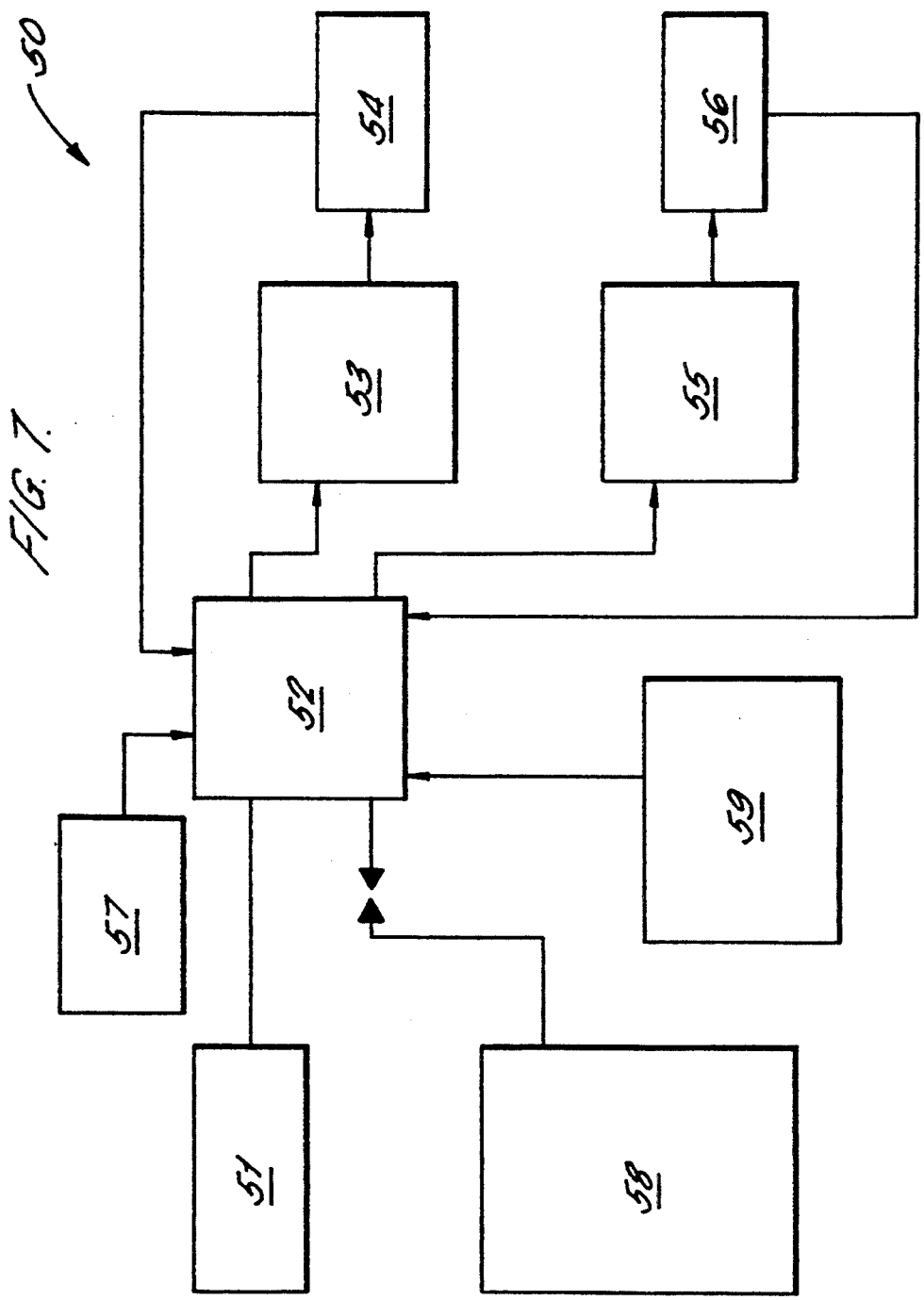
FIG. 7 is a schematic diagram illustrating a system for the automatic control of focus.

The apparatus 1 may alternatively be provided with an automatic zoom control and focusing system 50 as illustrated in FIG. 7. In such an alternative arrangement the apparatus would be provided with an electromechanical focus actuator 53 operable to move the image relaying means axially to compensate for movement of the focal plane of the zoom lens 45 during a change of magnification. A manual control is provided to select the required field of view and an object range sensor 51 produces an electrical signal representative of the range of the object from the objective lens 7. The output of the object range sensor is input to a processor 52 controlling actuation of the electromechanical focus actuator 53 which is operable to move the image relaying means 17 to the required value of displacement X3 from the objective lens 7.

A focus position sensor 54 provides feedback to the processor 52 as to the position of the image relaying means 17.

Movement of the movable lenses 8 and 13 of the zoom lens 45 is similarly controlled by electromagnetic actuators 55 and sensors 56 provide feedback to the processor as to the position of the lenses 8 and 13.

The required field of view is input to the processor 52 from an input 57 and the processor derives the required values of X1, X2 and X3 by means of a parameter lookup table 58.

Compensation for temperature effects is provided by a temperature responsive input 59.

Apparatus in accordance with the present invention may alternatively include a zoom lens having more than two movable lenses provided that corresponding means are provided for moving the movable lenses.

The viewing direction relative to the outer tube may be varied from the axial direction by the inclusion of suitable mirrors or prisms. The objective lens may for example be a lenticular prism. The mirror or prism may be movably mounted to provide scanning of the viewing direction. Also, for apparatus with a direction of view other than in the axial direction, the outer tube 2 together with the zoom lens 45 and the image relaying means 17 may be rotated in unison by up to 370° to facilitate orbital scanning of an inspection site.

The first and second control tubes 12 and 16 may alternatively be axially moved by actuators other than cam means. For example electromagnetic actuators could be utilised. The tubes could alternatively be replaced by suitable cables or control wires.

Alternative forms of image relaying means may be used such as an optical fibre bundle or an electronic camera device. Where an electronic camera device is utilised the apparatus may incorporate electronic automatic focusing of a type known in the art of video recording cameras.

We claim:

1. Apparatus for use as an endoscope or borescope for inspection of an inaccessible object comprising an outer-tube having a distal end which is insertable in use into an inaccessible location and a proximal end which is accessible to the user, a zoom lens within the outer tube adjacent the distal end and operable to focus an image of the object with variable magnification at a focal plane within the outer tube, the zoom lens comprising an objective lens which is fixed relative to the outer tube and a plurality of independently movable lenses, the apparatus further comprising an elongate viewing means for viewing the image and extending through the outer tube from a location at or adjacent to the focal plane to a location proximal of the proximal end and actuating means operable to move the movable lenses to change magnification and to synchronously move the viewing means relative to the objective lens to compensate for movement of the focal plane.

2. Apparatus as claimed in claim 1 wherein each of the movable lenses is provided with a respective axially movable control tube to which they are fixedly mounted, the control tubes extending coaxially within the outer tube and being engaged at their respective proximal end portions by the actuator means.

3. Apparatus as claimed in claim 2 wherein the actuating means comprises a cam means providing movement of the movable lenses and the viewing means in response to movement of an actuator.

4. Apparatus as claimed in claim 3 wherein the cam means comprises a cylindrical member, the cylindrical member being provided with circumferentially extending cam slots engaged by respective radial projections of the control tubes, and the cam slots being profiled such that rotation of the cylindrical member relative to the outer tube provides axial displacement of the respective movable lenses in accordance with a predetermined characteristic.

5. Apparatus as claimed in claim 4 wherein the cylindrical member is provided with a further cam slot engaged by a cam follower connected to the viewing means to effect axial movement of the viewing means relative to the objective lens by rotation of the cylindrical member.

6. Apparatus as claimed in claim 1 wherein the zoom lens comprises two movable lenses.

7. Apparatus as claimed in claim 1 wherein the viewing means comprises a housing connected to the actuating means to provide axial movement synchronised with movement of the movable lenses, an image relaying means operable to relay an image from the focal plane of the zoom lens to the user and an adjustable coupling operatively connecting the housing to the image relaying means so as to provide focus adjustment accommodating variation in object range.

8. Apparatus as claimed in claim 7 wherein the image relaying means includes an optical relay.

9. Apparatus as claimed in claim 7 comprising an object range sensor operable to produce an electrical signal representative of the range of the object from the objective lens and an electromechanical focus actuator operable in response to the signal to focus on the object by movement of the image relaying means relative to the housing.

* * * * *